United States Patent Office 2,797,222
Patented June 25, 1957

2,797,222
PREPARATION OF NEOPINE

Harold Conroy, Plainfield, N. J., assignor to Merck & Co., Inc., Rahway, N. J., a corporation of New Jersey No Drawing. Application August 16, 1954,
Serial No. 450,231

10 Claims. (Cl. 260—285)

This invention relates to the preparation of neopine and particularly to the preparation of neopine from 14-bromocodeinone and to an intermediate compound thus obtained.

The naturally occurring alkaloid neopine heretofore has not been prepared by synthesis, but was only available as an extract from opium. Neopine is an analgesic useful in medicine, and is also useful for conversion to other valuable analgesics.

An object of the invention is to produce neopine and a new intermediate compound useful in this process. Another object is to prepare neopine utilizing 14-bromocodeinone as the starting material. Other objects and the advantages of the invention will appear hereinafter.

In accordance with the invention neopine is prepared by reacting an alkali metal borohydride at low temperature with 14-bromocodeinone (Compound I) to form 14-bromocodeine (Compound II) which, upon further treatment with an alkali metal borohydride at a higher temperature, is converted to neopine (Compound III). These reactions may be chemically represented as follows:

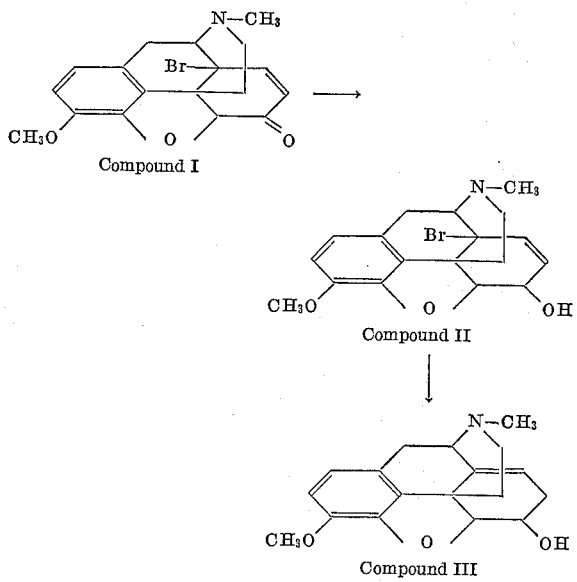

The 14-bromocodeinone is reduced with an alkali metal borohydride at low temperatures to form 14-bromocodeine. The reduction is carried out in a cold solution in which medium the 14-bromocodeine is insoluble. The cold solution, which is composed of a non-reactive diluent or solvent, may be water or mixtures of water with organic solvents such as methanol, ethanol, propanol, and the like. The temperature of the reaction is preferably maintained below 20° C., and a temperature of about 0° C. has been found most desirable. The reaction usually requires from one-quarter to one hour for completion. The alkali metal borohydride, which is preferably used in excess of the equimolar amount, is a boron compound having an alkali metal associated with a group consisting of a boron atom and at least one and up to four reactive hydrogen atoms. When there are less than four hydrogen atoms, the group containing the boron atom may contain one to three atoms other than hydrogen, or one to three radicals, which atoms or radicals are relatively inert and non-reactive with respect to the reducing action characteristic of the hydrogen atoms of these compounds, or a combination of such atoms other than hydrogen and radicals so long as at least one hydrogen atom is present and so long as the total number of atoms including hydrogen and radicals is four. Typical examples of these compounds are sodium borohydride, lithium borohydride, sodium triethylborohydride, sodium trimethoxyborohydride, triphenylborohydride, and potassium borohydride. The product, which separates as a solid during the reaction, is recovered by filtering the reaction mixture and washing the solid material with cold water. The separation of this insoluble intermediate provides an expedient method of producing a substantially pure final product.

The 14-bromocodeine is reduced with an alkali metal borohydride to form neopine. The reaction is preferably carried out in a diluent or non-reactive solvent such as water, methanol, ethanol, propanol, or aqueous mixtures of lower aliphatic alcohols. The temperature of the reaction is preferably room temperature or above, a temperature of about 40° C. being the more desirable. The alkali metal borohydride is preferably used in excess of the equimolar amount, and is the same group of compounds as defined above. The reaction usually requires from one to three hours for completion. The neopine can be recovered from the reaction mixture by extraction with chloroform, washing with water, and then drying and evaporating the solvent.

The following examples are given for purposes of illustration.

Example 1

A solution of 1½ g. of sodium borohydride in 10 cc. of water was added to 5 g. of 14-bromocodeinone in 50 cc. of methanol at 0° C. with stirring over a period of 10 minutes. After an additional 5 minutes at 0° C., the crystalline 14-bromocodeine was removed by filtration and washed with water. The yield was 3.3 g., M. P. 202° C. (d.).

Example 2

A one gram sample of 14-bromocodeine was suspended in a solution of 1.0 g. sodium borohydride in 15 cc. of water and warmed up to 40° C. Hydrogen gas was slowly evolved. The solution was allowed to stand 1½ hours at 40° C., then 20 cc. of 2.5 N sodium hydroxide was added, and the mixture heated for 10 minutes on a steam bath, cooled and extracted with chloroform. The organic extract was washed twice with water, dried and evaporated, leaving a colorless gum, which gave an infrared spectrum showing hydroxyl, and a negative halogen test. A sample was treated with hydrobromic acid to give the crystalline hydrobromide which was recrystallized twice from aqueous ethanol. The compound was identical with neopine hydrobromide in the infra-red, and a mixed melting point gave no depression.

Any departure from the above description which conforms to the present invention is intended to be included within the scope of the claims.

What is claimed is:

1. A process which comprises reacting 14-bromocodeinone with an alkali metal borohydride at a temperature below 20° C. to produce 14-bromocodeine, separating the 14-bromocodeine from the reaction mixture and reacting the recovered 14-bromocodeine with an alkali metal borohydride at a higher temperature to produce neopine.

2. A process which comprises first reacting 14-bromocodeinone with an alkali metal borohydride at a temperature below 20° C. to produce 14-bromocodeine, and second reacting the 14-bromocodeine with an alkali metal borohydride at a higher temperature to produce neopine.

3. The process of claim 2 wherein the reactions are carried out in aqueous alcoholic solutions.

4. The process of claim 3 wherein the first reaction is carried out for a period of one-quarter to one hour.

5. The process of claim 4 wherein the second reaction is carried out in one to three hours.

6. The process of claim 5 wherein the alkali metal borohydrides are both sodium borohydride.

7. The process of claim 6 wherein the aqueous alcoholic solutions are aqueous solutions of methanol.

8. A process which comprises reacting 14-bromocodeine with an alkali metal borohydride at a temperature of above 20° C. to produce neopine.

9. The process of claim 8 wherein the alkali metal borohydride is sodium borohydride.

10. The process of claim 9 wherein the temperature is approximately 40° C.

References Cited in the file of this patent

Gates: J. Am. Chem. Soc., vol. 75, pp. 4340–41.
Nakamura: Chem. Abstr., vol. 46, cols. 126–7 (1952).
Speyer et al.: Berichte, vol. 58B, pp. 1117–19 (1925).